United States Patent
Pilote et al.

(10) Patent No.: US 9,458,518 B2
(45) Date of Patent: Oct. 4, 2016

(54) STARTING A SMELTING PROCESS

(71) Applicant: TECHNOLOGICAL RESOURCES PTY. LIMITED, Brisbane (AU)

(72) Inventors: Jacques Pilote, Doubleview (AU); Rodney James Dry, City Beach (AU); Hendrikus Koenraad Albertus Meijer, Uitgeest (NL)

(73) Assignee: Technological Resources Pty. Limited, Brisbane (AU)

( * ) Notice: Subject to any disclaimer, the term of this patent is extended or adjusted under 35 U.S.C. 154(b) by 202 days.

(21) Appl. No.: 14/363,262

(22) PCT Filed: Dec. 6, 2012

(86) PCT No.: PCT/AU2012/001481
§ 371 (c)(1),
(2) Date: Jun. 5, 2014

(87) PCT Pub. No.: WO2013/082653
PCT Pub. Date: Jun. 13, 2013

(65) Prior Publication Data
US 2014/0318319 A1 Oct. 30, 2014

(30) Foreign Application Priority Data
Dec. 6, 2011 (AU) ................................ 2011905072

(51) Int. Cl.
| | | |
|---|---|---|
| *C21B 5/00* | (2006.01) | |
| *C22B 5/10* | (2006.01) | |
| *C21C 5/54* | (2006.01) | |
| *C21C 5/00* | (2006.01) | |
| *C21C 5/46* | (2006.01) | |
| *C21C 5/04* | (2006.01) | |
| *C22B 5/12* | (2006.01) | |
| *C21B 13/00* | (2006.01) | |
| *C21B 13/02* | (2006.01) | |

(52) U.S. Cl.
CPC . *C21C 5/00* (2013.01); *C21B 5/00* (2013.01); *C21B 5/001* (2013.01); *C21B 13/0006* (2013.01); *C21B 13/023* (2013.01); *C21C 5/04* (2013.01); *C21C 5/4606* (2013.01); *C22B 5/10* (2013.01); *C22B 5/12* (2013.01); *Y02P 10/136* (2015.11)

(58) Field of Classification Search
CPC ... C21C 5/4606; C21B 13/006; C21B 5/001; C21B 5/00; C22B 5/10
See application file for complete search history.

(56) References Cited

U.S. PATENT DOCUMENTS

| | | |
|---|---|---|
| 6,517,605 B1 | 2/2003 | Bates et al. |
| 8,366,992 B2 * | 2/2013 | Williams ............ C21B 13/0013 266/225 |
| 2008/0295647 A1 * | 12/2008 | Kwon ........................ C10J 3/20 75/436 |
| 2009/0031858 A1 * | 2/2009 | Farr ........................ C21B 11/08 75/485 |
| 2010/0011908 A1 | 1/2010 | Goodman |

FOREIGN PATENT DOCUMENTS

| | | |
|---|---|---|
| WO | 0022176 A1 | 4/2000 |
| WO | 2006119575 A1 | 11/2006 |

OTHER PUBLICATIONS

International Search Report mailed Feb. 11, 2013 (PCT/AU2012/001481); ISA/AU.
Written Opinion mailed Feb. 11, 2013 (PCT/AU2012/001481); ISA/AU.
Australian Patent Office International-Type Search Report mailed Apr. 2, 2012 (PCT/AU2012/001481); ISA/AU.

\* cited by examiner

*Primary Examiner* — George Wyszomierski
*Assistant Examiner* — Tima M McGuthry Banks
(74) *Attorney, Agent, or Firm* — Banner & Witcoff, Ltd.

(57) ABSTRACT

A method of starting a molten-bath based melting process includes establishing a sufficiently large and stable "hot zone" for ignition of oxygen and coal in a main chamber of a smelting vessel by independent means, i.e. independently of and before supplying cold oxygen and coal into the main chamber.

21 Claims, 2 Drawing Sheets

STARTING A SMELTING PROCESS

CROSS-REFERENCE TO RELATED APPLICATIONS

The present application is a U.S. National Phase filing of International Application No. PCT/AU2012/001481, filed on Dec. 6, 2012, designating the United States of America and claiming priority to Australian Patent Application No. 2011905072, filed Dec. 6, 20122011, and this application claims priority to and the benefit of the above-identified applications, which are both incorporated by reference herein in their entireties.

TECHNICAL FIELD

The present invention relates to a method of starting a process for smelting a metalliferous material.

The term "metalliferous material" is understood herein to include solid feed material and molten feed material. The term also includes within its scope partially reduced metalliferous material.

BACKGROUND ART

The present invention relates particularly, although by no means exclusively, to a method of starting a molten bath-based smelting process for producing molten metal from a metalliferous feed material in a smelting vessel that has a strong bath/slag fountain generated by gas evolution in the molten bath, with the gas evolution being at least partly the result of devolatilisation of carbonaceous material in the molten bath.

In particular, although by no means exclusively, the present invention relates to a method of starting a process for smelting an iron-containing material, such as an iron ore, and producing iron.

The present invention relates particularly, although by no means exclusively, to a method of starting a smelting process in a smelting vessel that includes a main chamber for smelting metalliferous material.

A known molten bath-based smelting process, generally referred to as the HIsmelt process, is described in a considerable number of patents and patent applications in the name of the applicant.

Another molten bath-based smelting process, referred to hereinafter as the "HIsarna" process, is described in International application PCT/AU99/00884 (WO 00/022176) in the name of the applicant.

The HIsmelt process and the HIsarna process are associated particularly with producing molten iron from iron ore or another iron-containing material.

The HIsarna process is carried out in a smelting apparatus that includes (a) a smelting vessel that includes a main smelting chamber and lances for injecting solid feed materials and oxygen-containing gas into the main chamber and is adapted to contain a bath of molten metal and slag and (b) a smelt cyclone for pre-treating a metalliferous feed material that is positioned above and communicates directly with the smelting vessel.

The term "smelt cyclone" is understood herein to mean a vessel that typically defines a vertical cylindrical chamber and is constructed so that feed materials supplied to the chamber move in a path around a vertical central axis of the chamber and can withstand high operating temperatures sufficient to at least partially melt metalliferous feed materials.

In one form of the HIsarna process, carbonaceous feed material (typically coal) and optionally flux (typically calcined limestone) are injected into a molten bath in the main chamber of the smelting vessel. The carbonaceous material is provided as a source of a reductant and a source of energy. Metalliferous feed material, such as iron ore, optionally blended with flux, is injected into and heated and partially melted and partially reduced in the smelt cyclone. This molten, partly reduced metalliferous material flows downwardly from the smelt cyclone into the molten bath in the smelting vessel and is smelted to molten metal in the bath. Hot reaction gases (typically CO, $CO_2$, $H_2$, and $H_2O$) produced in the molten bath is partially combusted by oxygen-containing gas (typically technical-grade oxygen) in an upper part of the main chamber. Heat generated by the post-combustion is transferred to molten droplets in the upper section that fall back into the molten bath to maintain the temperature of the bath. The hot, partially-combusted reaction gases flow upwardly from the main chamber and enter the bottom of the smelt cyclone. Oxygen-containing gas (typically technical-grade oxygen) is injected into the smelt cyclone via tuyeres that are arranged in such a way as to generate a cyclonic swirl pattern in a horizontal plane, i.e. about a vertical central axis of the chamber of the smelt cyclone. This injection of oxygen-containing gas leads to further combustion of smelting vessel gases, resulting in very hot (cyclonic) flames. Finely divided incoming metalliferous feed material is injected pneumatically into these flames via tuyeres in the smelt cyclone, resulting in rapid heating and partial melting accompanied by partial reduction (roughly 10-20% reduction). The reduction is due to both thermal decomposition of hematite and the reducing action of $CO/H_2$ in the reaction gases from the main chamber. The hot, partially melted metalliferous feed material is thrown outwards onto the walls of the smelt cyclone by cyclonic swirl action and, as described above, flows downwardly into the smelting vessel below for smelting in the main chamber of that vessel.

The net effect of the above-described form of the HIsarna process is a two-step countercurrent process. Metalliferous feed material is heated and partially reduced by outgoing reaction gases form the smelting vessel (with oxygen-containing gas addition) and flows downwardly into the smelting vessel and is smelted to molten iron in the smelting vessel. In a general sense, this countercurrent arrangement increases productivity and energy efficiency.

The above description is not to be taken as an admission of the common general knowledge in Australia or elsewhere.

The applicant has proposed that the HIsarna process and an oxygen-blown version of the HIsmelt process be started up in a smelting vessel by feeding hot metal (from an external source) into the main chamber of the vessel via the forehearth of the vessel, commencing supplying oxygen-containing gas (typically technical grade oxygen) and solid carbonaceous material (typically coal) and generating heat in the main chamber. This hot start-up method generates heat via spontaneous ignition of combustible material in the main chamber. The applicant has proposed that this initial step in the hot start-up method be followed by the addition of slag-forming agents and, later on, by the addition of metalliferous feed material (such as ferruginous material such as iron ore) into the main chamber. The hot start method is described in a companion International application entitled "Starting a Smelting Process" lodged in the name of the applicant on the same day as the subject International application for the present invention.

In pilot plant trials of the HIsarna process that were based on technical grade oxygen as the oxygen-containing gas, coal as the solid carbonaceous material, and iron ore fines as the metalliferous material, the above hot start-up method was tested. The applicant found that there is a finite time-window after pouring hot metal into the main chamber of the smelting vessel within which it is possible to safely commence supplying cold oxygen and coal into the main chamber and have spontaneous ignition of combustible material and generate heat in the main chamber which is necessary to start up the process. This time window was found to be typically around 1-2 hours in duration under the pilot plant conditions. The time-window was found to be variable depending on (amongst other factors) smelting vessel geometry, charge metal temperature and charge metal chemistry. It was also found that if the steps of commencing supplying oxygen and coal into the main chamber were not implemented within the requisite time-window, it became impossible to guarantee spontaneous ignition of coal and cold oxygen inside the main chamber. This resulted in a mixture of un-combusted coal and oxygen leaving the main chamber, with a possibility of a coal dust explosion (and associated damage) in downstream equipment.

The applicant has found that the mechanism associated with this time-window is related to the formation of a slag layer on top of the molten metal. Once this slag layer is sufficiently well established, it is cooled by radiation to the smelting vessel, for example to water panels in a top space of the main chamber, and becomes crusty, effectively creating a blanket on the molten metal. The blanket acts as a thermal insulator that restricts heat transfer from the molten metal below the blanket to the top space of the main chamber above the blanket, with a result that the thermal conditions in the top space are too cold to support spontaneous ignition of combustible material in the top space. Whilst not wishing to be bound by the following comment, the applicant believes that this slag formed during the pilot plant trials primarily from (i) residual slag coatings left behind from previous operations and (ii) oxygen reacting with constituents in molten metal (silicon in particular, reacting to form silicon dioxide).

The applicant also found in the pilot plant trials that essentially the same problem occurred if the plant was operating normally and was then stopped (including stopping supplying solid feed materials to the main chamber) for a significant period of time (for example, to perform mechanical repairs outside the smelting vessel). Under these conditions the slag layer is generally significantly thicker compared to the slag layer at start-up of the process. Hot metal is significantly further below the surface of the slag, and is therefore less able to keep the slag upper surface hot by conduction. Surface slag heat was lost to the smelting vessel, for example to water-cooled panels in the top space of the main chamber, by radiation, and a cold, crusty layer formed on the molten bath more rapidly than before. When the smelting vessel was idle for more than about 15-30 minutes, spontaneous ignition of coal and cold oxygen and hence heat generation required to support process start-up in the main chamber of the smelting vessel was once again impossible to guarantee.

During the course of the pilot plant trials the applicant developed a safe, practical method to start the HIsarna process under these conditions. An important basis of the method is recognising the necessity (before cold oxygen and coal or other suitable oxygen-containing gas and solid carbonaceous material can be introduced) to establish a sufficiently large and stable "hot zone" for ignition of oxygen and coal in the main chamber of the smelting vessel by independent means, i.e. independently of and before supplying cold oxygen and coal into the main chamber.

The method of starting a smelting process of the present invention is applicable to starting (which term includes "re-starting") any molten bath-based smelting process when the thermal conditions (temperatures) inside a top space of the main chamber of the smelting vessel are too cold to allow safe, spontaneous ignition of any newly supplied cold oxygen-containing gas and solid carbonaceous material into the main chamber. As described above, such conditions are typically encountered when a crusty frozen slag layer is present on the upper surface of the molten bath in the main chamber.

SUMMARY OF THE DISCLOSURE

According to the present invention there is provided a method of starting a molten-bath based process for smelting a metalliferous feed material to form a molten metal in a smelting apparatus, with the apparatus including a smelting vessel that includes a main chamber that contains a bath of molten metal and there is no injection of solid feed materials into the smelting apparatus at the time of commencing the method, and with the method including the steps of:

(a) inserting an external ignition source into the main chamber of the smelting vessel to form a hot zone in the main chamber, (b) commencing supplying a cold oxygen-containing gas into the main chamber and igniting combustible material in the main chamber, (c) commencing supplying a carbonaceous material into the main chamber and increasing the temperature in the main chamber and melting frozen materials in the main chamber, and (d) commencing supplying a metalliferous material into the main chamber and smelting the metalliferous material and producing molten metal in the main chamber.

The term "cold" in the context of oxygen-containing gas is understood herein to mean cold in the sense that the gas is at a temperature below that required for spontaneous ignition of the carbonaceous material and the oxygen-containing gas mixture (i.e. below about 700-800° C. in the case of a coal-oxygen mixture).

The term "frozen materials" referred in step (c) above includes by way of example a layer of slag, such as the crusty layer of slag found in the pilot plant trials.

The method may include supplying a combustible material to the main chamber prior to step (a) above. By way of example, the method may include supplying a solid combustible material (such as wood, charcoal or other suitable solid material) into the main chamber by manually inserting the combustible material through an opening (such as the slag notch) in the main chamber. By way of further example, the method may include supplying a gaseous combustible material or a liquid combustible material into the main chamber. The gaseous combustible material may be natural gas. The liquid combustible material may be oil.

This optional step of feeding the combustible material into the main chamber prior to step (a) may not be required in situations where the crusty layer is thin and/or not fully formed and there may be sufficient combustible material already in the main chamber to support combustion via the ignition source when oxygen-containing gas supply is commenced in step (b). In some situations, for example when the method is used after a short interruption to a smelting campaign, the crusty layer may not be fully established and there may be sufficient residual combustible material in the vessel to support ignition when oxygen-containing gas supply is commenced in step (b). In other situations, the method may include supplying a combustible material to the main chamber after step (a) of inserting the external ignition source into the main chamber and prior to step (b) of commencing supplying the cold oxygen-containing gas into the main chamber and igniting combustible material in the main chamber. The combustible material may be a solid or a gaseous or a liquid combustible material as described above.

In general, the above options of supplying a combustible material to the vessel prior to or after inserting the external ignition source into the main chamber may be used at different times. If a plant stoppage is relatively short (but too long to simply commence supplying coal and oxygen or other suitable carbonaceous material and oxygen-containing gas without providing an ignition source), then the addition of combustible material into the main chamber prior to step (b) may not be necessary. For longer stoppages the other options involving supplying the combustible material into the main chamber prior to or after step (a) may be required.

The method may include (under start-up conditions or when a slag inventory in the main chamber is low) commencing supplying slag or slag forming materials to the main chamber to form a slag on the molten metal after step (c) and before step (d) above.

The ignition source for step (a) of inserting the external ignition source into the main chamber may be adapted to operate for a time-duration of at least 3 minutes, typically at least 5 minutes.

The ignition source for step (a) may be selected on the basis that it does not require gaseous oxygen in the main chamber in order to stay alight.

The ignition source for step (a) may carry its own "on-board" oxygen (e.g. in the form of iron oxide) such that it burns regardless of whether it is in air, oxygen or nitrogen. With regard to the reference to nitrogen, it is noted that nitrogen (or some other inert gas) purge of solids injection lances will generally be used and, at this point in the method, there may be little if any gaseous oxygen available inside the main chamber.

The ignition source for step (a) may be a magnesium-based flare.

The method may include verifying that the external ignition source is alight in the main chamber after inserting the external ignition source into the main chamber in step (a).

The step of verifying that the ignition source is alight in the main chamber may be via direct observation or via a camera mounted within a suitable opening such as a slag notch in the smelting vessel.

Step (b) of commencing supplying the cold oxygen-containing gas and igniting combustible material in the main chamber may include commencing supplying oxygen into the main chamber and igniting combustible material in the main chamber.

Step (b) of commencing supplying the cold oxygen-containing gas and igniting combustible material in the main chamber may include commencing supplying technical grade oxygen at a feed temperature below 800° C. into the main chamber and igniting combustible material in the main chamber.

Step (b) of commencing supplying the cold oxygen-containing gas and igniting combustible material in the main chamber may include commencing supplying a small amount of cold oxygen (typically 10-30% of normal oxygen flow for the process) to the main chamber. In such a situation, combustible material present in the main chamber (such as residual carbonaceous material from an earlier operation and/or wood as the optional combustible material supplied to the main chamber prior to step (a)) should ignite and burn.

The method may include verifying ignition of combustible material after step (b) of igniting combustible material in the main chamber.

The step of verifying ignition may be via direct observation or via a suitable camera that material is burning in the main chamber. The use of wood as the optional combustible material supplied to the main chamber prior to step (a) is particularly advantageous since it will burn for several minutes with a bright, easy-to-recognise flame.

Step (c) of commencing supplying the carbonaceous material into the main chamber may include supplying the carbonaceous material at a feed temperature below 150° C. The carbonaceous material may be a solid material (such as coal) or a gaseous material (such as natural gas) or a liquid material (such as oil).

Step (c) may include verifying that carbon dioxide generation in the main chamber is ongoing via an on-line gas analysis system.

Step (d) may include ramping up supplying the oxygen-containing gas and the carbonaceous material supplied in earlier steps of the method or supplying increasing amounts of other oxygen-containing gas and carbonaceous material into the main chamber. By way of example, it may be preferable to use gaseous carbonaceous material in step (c) of the method and to switch over to supplying a solid carbonaceous material when the metalliferous material is supplied to the main chamber in step (d).

Step (d) may include ramping up supplying the metalliferous material into the main chamber.

The apparatus may include (i) the above-described smelting vessel that is adapted to contain a bath of molten metal and (ii) a smelt cyclone that is positioned above and communicates with the smelting vessel. In that event, step (d) may include commencing supplying the metalliferous feed material and the oxygen-containing gas into the smelt cyclone and generating a horizontally rotating flow of material in the cyclone and combusting combustible gas flowing upwardly into the cyclone from the vessel and partially reducing and melting the metalliferous feed material in the cyclone, whereby the partially reduced molten metalliferous feed material flows downwardly from the cyclone into the molten bath of metal and slag in the main chamber of the smelting vessel and is smelted to molten metal in the bath.

The method of present invention is applicable to a molten bath-based smelting apparatus that includes (a) a smelting vessel that has a main chamber that is adapted to contain the bath of molten metal and slag, (b) lances or other suitable means for supplying the carbonaceous material into the bath, (c) lances or other suitable means for supplying the oxygen-containing gas into the bath (d) lances or other suitable means for supplying the metalliferous material to the bath, either directly or via a smelt cyclone, (e) a means such as a forehearth for removing metal and slag from the main chamber, and (f) at least 40%, typically at least 50%, of the wall region of the smelting vessel above the bath being covered by water-cooled panels with frozen slag layers.

Under normal operating conditions, the molten bath-based smelting process includes the steps of:

(a) supplying the carbonaceous material and the metalliferous material (which may be solid or molten) into the molten bath and generating reaction gas and smelting metalliferous material and producing molten metal in the bath, (b) supplying the oxygen-containing gas into the main chamber for above-bath combustion of combustible gas released from the bath and generating heat for in-bath smelting reactions, with the oxygen-containing gas typically being technical-grade oxygen which is "cold" in the sense that it is at a temperature significantly below that required for safe ignition of a coal-oxygen mixture (i.e. below about 700-800° C.); and (c) producing significant upward movement of molten material from the bath by gas upwelling in order to create heat-carrying droplets and splashes of molten material which are heated when projected into the combustion region in the top space of the main chamber and thereafter fall back into the bath, whereby the droplets and splashes carry heat downwards into the bath where it is used for smelting of the metalliferous material.

The oxygen-containing gas may be air, oxygen, or oxygen-enriched air.

BRIEF DESCRIPTION OF THE DRAWINGS

An embodiment of a method of starting a smelting process in a smelting vessel in accordance with the present invention is described with reference to the accompanying drawings, of which.

DESCRIPTION OF EMBODIMENT(S)

The HIsarna process smelts metalliferous feed material and produces process outputs of molten metal, molten slag, and an off-gas. The following description of the HIsarna process is in the context of smelting metalliferous material in the form of iron ore. The present invention is not limited to this type of metalliferous material.

Figure 1:
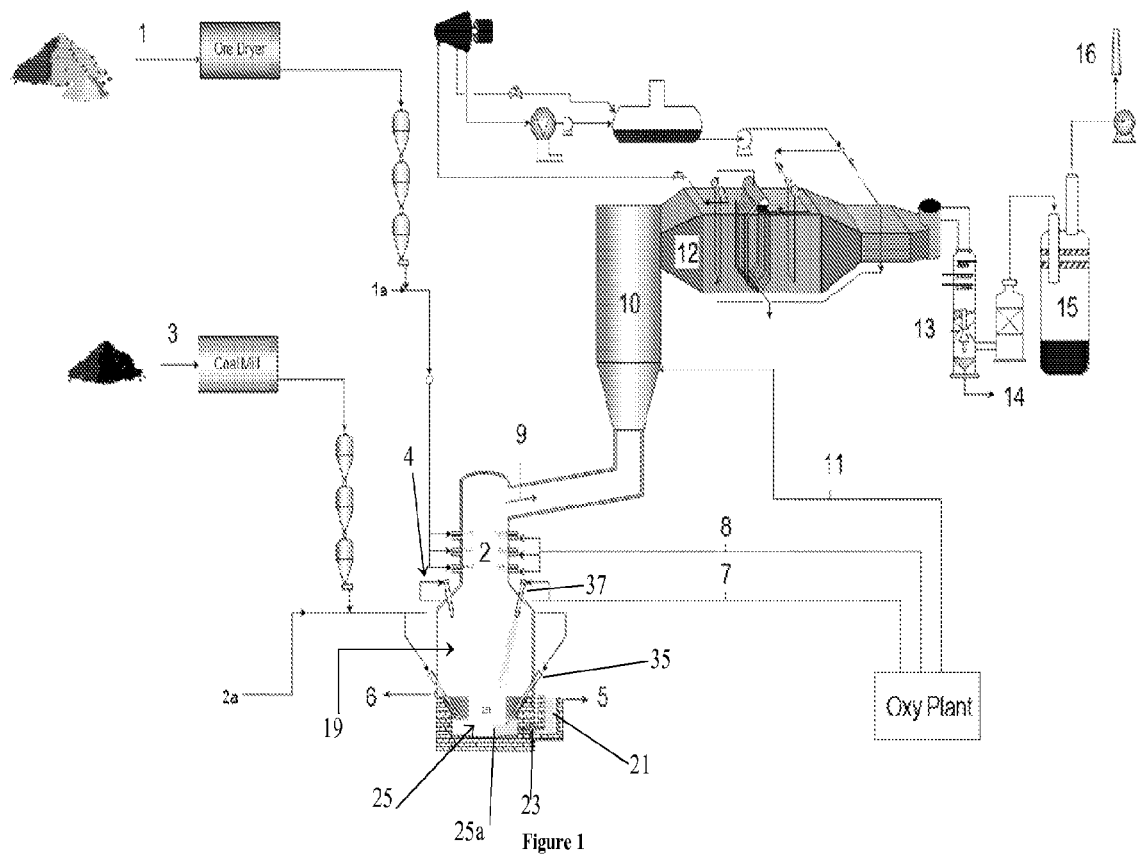
FIG. 1 is a diagrammatic view of a HIsarna apparatus for smelting a metalliferous material and producing molten metal in accordance with one embodiment of the HIsarna process.

The HIsarna apparatus shown in FIG. 1 includes a smelt cyclone 2 and a molten bath-based smelting vessel 4 having a main chamber 19 located directly beneath the smelt cyclone 2, with direct communication between the chambers of the smelt cyclone 2 and the smelting vessel 4.

Figure 2:
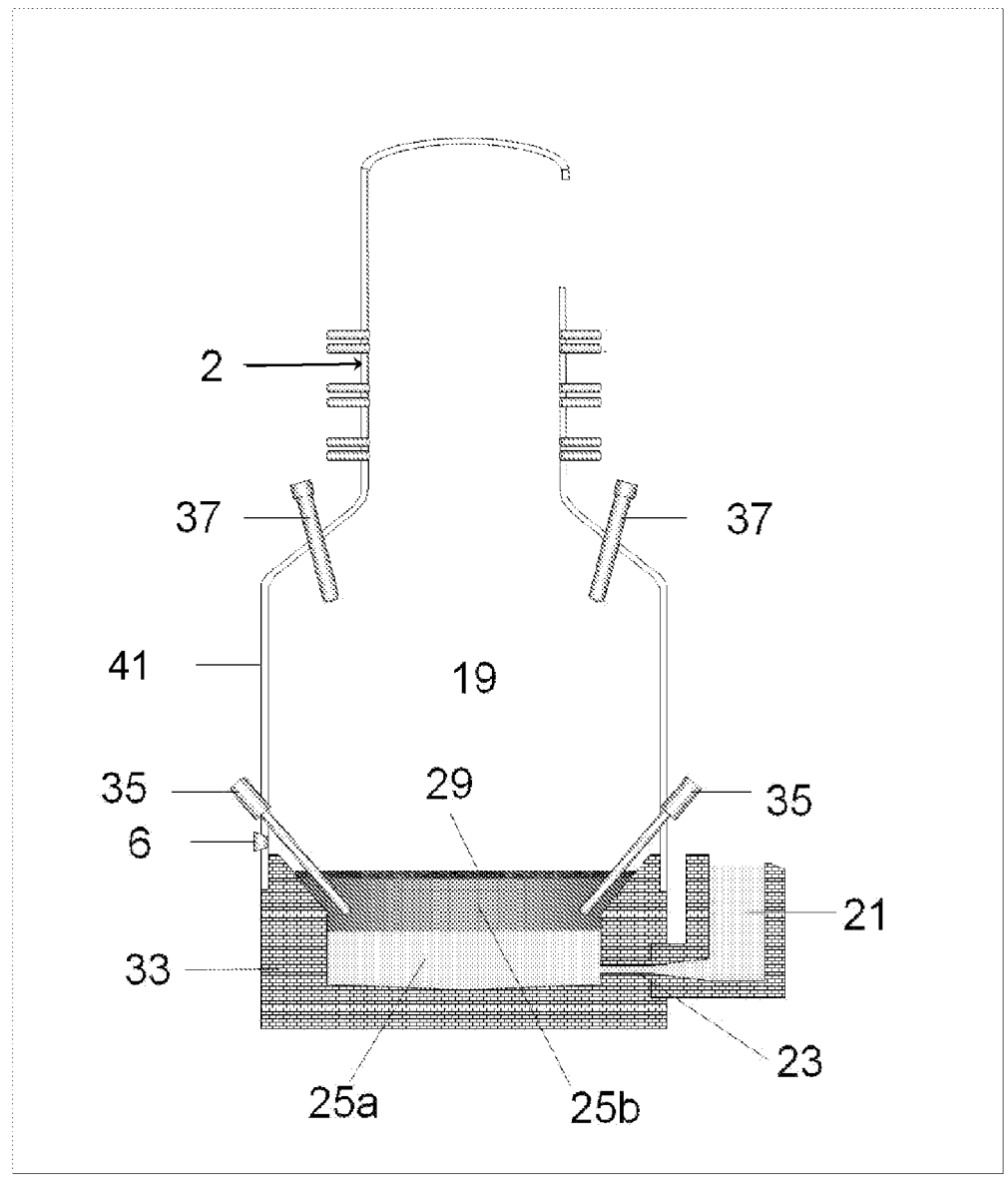
FIG. 2 is an enlarged cross-sectional view of the smelting vessel shown in FIG. 1 which illustrates the condition of the smelting vessel when the vessel has been "idle" for more than 15-30 minutes, either during start-up of the process or during a re-start of the process following an interruption to the process of more than 15-30 minutes, and there is crusty layer on the molten metal and molten slag layers in the vessel.

With reference to FIG. 1, during steady-state operation of a smelting campaign, a blend of magnetite-based ore (or other iron ore) with a top size of 6 mm and flux such as limestone 1 is fed, via an ore dryer, and with a pneumatic conveying gas 1a, into the smelt cyclone 2. Limestone represents roughly 8-10 wt % of the combined stream of ore and limestone. Oxygen 8 is injected into the smelt cyclone 2 via tuyeres to preheat and partly melt and partly reduce the ore. The oxygen 8 also combusts combustible gas flowing upwardly into the smelt cyclone 2 from the smelting vessel 4. The partly melted and partly reduced ore flows downwardly from the smelt cyclone 2 into a molten bath 25 of metal and slag in the main chamber 19 in the smelting vessel 4. The partly melted and partly reduced ore is smelted to form molten iron in the molten bath 25. Coal 3 is fed, via a separate dryer, to the main chamber 19 of the smelting vessel 4. The coal 3 and a conveying gas 2a are injected via lances 35 into the molten bath 25 of metal and slag in the main chamber 19. The coal provides a source of a reductant and a source of energy. FIGS. 1 and 2 show the molten bath 25 as comprising two layers, of which layer 25a is a molten metal layer and layer 25b is a molten slag layer. The Figures illustrate the layers as being of uniform depth. This is for illustration purposes only and is not an accurate representation of what would be a highly agitated and well-mixed bath in operation of the HIsarna process. The mixing of the molten bath 25 is due to devolatilisation of coal in the bath, which generates gas, such as CO and $H_2$, and results in upward movement of gas and entrained material from the molten bath into a top space of the main chamber 19 that is above the molten bath 25. Oxygen 7 is injected into the main chamber 19 via lances 37 to post-combust some of these gases, typically CO and $H_2$, generated in and released from the molten bath 25 in the top space of the main chamber 19 and provide the necessary heat for the smelting process in the bath.

Normal operation of the HIsarna process during a smelting campaign involves (a) coal injection via lances 35 and cold oxygen injection via lances 37 into the main chamber 19 of the smelting vessel 4 and (b) ore injection 7 and additional oxygen injection 8 into the smelt cyclone 2.

The operating conditions, including but not limited to, coal and oxygen feed rates into the main chamber 19 of the smelting vessel 4 and ore and oxygen feed rates into the smelt cyclone 2 and heat losses from the main chamber 19, are selected so that offgas leaving the smelt cyclone 2 via an offgas outlet duct 9 has a post-combustion degree of at least 90%.

Offgas from the smelt cyclone 2 passes via an offgas duct 9 to an offgas incinerator 10, where additional oxygen 11 is injected to burn residual $CO/H_2$ and provide a degree of free oxygen (typically 1-2%) in the fully combusted flue gas.

Fully combusted offgas then passes through a waste heat recovery section 12 where the gas is cooled and steam is generated. Flue gas then passes through a wet scrubber 13 where cooling and dust removal are achieved. The resulting sludge 14 is available for recycle to the smelter via the ore feed stream 1.

Cool flue gas leaving the scrubber 13 is fed to a flue gas desulphurisation unit 15.

Clean flue gas is then vented via a stack 16. This gas consists mainly of $CO_2$ and, if appropriate, it can be compressed and geo-sequestered (with appropriate removal of residual non-condensable gas species).

With particular reference to the enlarged cross-sectional view of the smelting vessel 4 shown in FIG. 2, the vessel 4 includes a refractory-lined hearth 33 and side walls 41 defined predominantly by water-cooled panels that define the main chamber 19. The smelting vessel 4 also includes a forehearth 21 which is connected to the main chamber 19 via a forehearth connection 23. During the course of a smelting campaign of the HIsarna process, molten metal produced in the main chamber 19 discharges from the main chamber 19 via the forehearth connection 23 and the forehearth 21.

With further reference to FIG. 2, when the HIsarna process is interrupted for whatever reason and the process has not been operating for more than 15-30 minutes (i.e. there has been no injection of solid feed materials into the smelt cyclone 2 and the smelting vessel 4 for this period of time), based on the pilot plant trials mentioned above, a crusty layer 29 forms on the slag surface in the main chamber 19. The formation of the crusty layer 29 indicates that it is not possible to guarantee safe, spontaneous ignition of coal and cold oxygen supplied to the main chamber to start the HIsarna process and, moreover, supplying coal and cold oxygen into the main chamber under these conditions may result in a mixture of un-combusted coal and oxygen leaving the main chamber, with a possibility of a coal dust explosion (and associated damage) in downstream equipment.

In accordance with one embodiment of the method of the present invention, in order to safely start the HIsarna process in this "idle" state, the following steps are taken:

1. Slag notch 6 is opened and combustible material in the form of 10-20 long, thin planks of wood (each around one third to one half of the diameter of the main chamber 19 of the smelting vessel 4 in length and sized to fit easily through the slag notch 6) are manually pushed into the main chamber 19.
2. A flare of the type routinely in BOF steelmaking (e.g. Beko Vuurwerk BV, Hoogoven Fakkel Item No 4490) is cast into the main chamber 19 via the slag notch 6, and direct visual observation is used to confirm that the flare is burning inside the main chamber 19. The flare forms a hot zone in the main chamber 19.
3. Cold oxygen is supplied into the main chamber 19 via lances 37 at a flow rate of about 10-30% of normal process flow, i.e. normal process flow when the HIsarna process is operating at the rated metal production for the process in the smelting apparatus.
4. Once it has been verified (for example, by direct observation) that there is an oxygen-based flame inside the main chamber 19 due to ignition by the hot zone, coal is supplied to the main chamber 19 via lances 35 at a rate of about 5-20% of normal process flow.
5. Once coal ignition has been verified, for example by direct observation, the slag notch 6 is closed and the offgas composition from the main chamber 19 is monitored via a normal on-line gas analysis system to ensure ongoing generation of carbon dioxide.
6. Coal and oxygen are ramped up as per normal start-up practice, and a heating run (coal and oxygen feed only) is performed for a period to re-melt slag in the main chamber and establish suitable conditions for ore feed. The duration of the heating run will vary according to how long the plant has been off-line, and will typically be in the range 0.5-2 hours.
7. Once the heating run is complete, ore and oxygen are supplied into the smelt cyclone 2 and ore is melted and partially reduced and flows downwardly into the main chamber 19 and iron production commences in the main chamber—as described above in relation to FIG. 1.

The above description focuses on starting the HIsarna process after there has been a process interruption of at least 15-30 minutes during which a crusty slag layer 29 forms on the molten bath in the main chamber 19. The same method steps 1-7 to start the HIsarna process set out above can be used during an initial start-up process for the HIsarna process in a situation where a crusty layer 29 forms during the course of that start-up process.

Many modifications may be made to the embodiment of the process of the present invention described above without departing from the spirit and scope of the invention.

By way of example, step 1 is not confined to the use of solid combustible material, and gaseous or liquid combustible materials may also be used.

By way of further example, the present invention is not limited to the addition of combustible material prior to inserting the ignition source into the smelting vessel 4. Specifically, there may be situations where it is preferable to add combustible material after inserting the ignition source into the vessel and before commencing supply of cold oxygen (or other suitable oxygen-containing gas). In some situations, the addition of combustible material may not be required at all and ignition can be achieved on the basis of residual combustible material in the smelting vessel 4.

By way of further example, visual (or other) observation that the ignition source is alight may not be necessary in step 2 in situations where the ignition source has its own source of oxygen.

By way of further example, the present invention is not confined to the time duration of at least 15-30 minutes during which there is no supply of solid feed materials into the smelt cyclone 2 and the smelting vessel 4. The time period may vary depending on a range of factors including the type of metalliferous material and the characteristics of the smelting vessel, such as the rate of heat loss from slag to the vessel. In any given situation, the time period is the time required for crusty slag to form on the molten bath to an extent that it is problematic to start injection of cold oxygen and coal to the main chamber 19 of the smelting vessel 4.

The above description focuses on coal as the carbonaceous material and technical grade oxygen for the oxygen-containing gas. The present invention is not so limited and extends to any suitable oxygen-containing gas and any suitable solid carbonaceous materials.

The above-described embodiment focuses on the HIsarna process. The present invention is not limited to the HIsarna process and extends to any molten bath-based process in a smelting vessel. By way of example, the present invention extends to the oxygen-blown version of the HIsmelt process. As is indicated above, the HIsmelt process is described in a considerable number of patents and patent applications in the name of the applicant. By way of example, the HIsmelt process is described in International application PCT/AU96/00197 in the name of the applicant. The disclosure in the patent specification lodged with the International application is incorporated herein by cross-reference.

The invention claimed is:

1. A method of starting a molten-bath based process for smelting a metalliferous feed material to form a molten metal in a smelting apparatus, with the apparatus including a smelting vessel that includes a main chamber that contains frozen materials and a bath of molten metal, and with the method including the steps of:
    (a) inserting an external ignition source into the main chamber of the smelting vessel to form a hot zone in the main chamber;
    (b) commencing supplying a cold oxygen-containing gas into the main chamber and igniting combustible material in the main chamber,
    (c) commencing supplying a carbonaceous material into the main chamber and increasing the temperature in the main chamber and melting the frozen materials in the main chamber, and
    (d) commencing supplying metalliferous material into the main chamber and smelting the metalliferous material and producing molten metal in the main chamber.

2. The method defined in claim 1 includes supplying a combustible material to the main chamber prior to step (a) of inserting the external ignition source into the main chamber.

3. The method defined in claim 2 includes supplying the combustible material into the main chamber by manually inserting the combustible material through an opening in the main chamber.

4. The method defined in claim 1 includes supplying a combustible material to the main chamber after step (a) of inserting the external ignition source into the main chamber and prior to step (b) of commencing supplying the cold oxygen-containing gas into the main chamber and igniting the combustible material in the main chamber.

5. The method defined in claim 1 includes commencing supplying slag or slag forming materials into the main chamber and forming a slag on the molten metal after step (c) and before step (d).

6. The method defined in claim 1 wherein the ignition source is adapted to operate for a time-duration of at least 3 minutes.

7. The method defined in claim 1 wherein the ignition source is selected on the basis that it does not require gaseous oxygen in the main chamber in order to stay alight.

8. The method defined in claim 1 wherein the ignition source for step (a) carries its own oxygen such that it burns regardless of whether it is in air, oxygen or nitrogen.

9. The method defined in claim 1 wherein the ignition source for step (a) is a magnesium-based flare.

10. The method defined in claim 1 includes verifying that the external ignition source is alight in the main chamber after inserting the external ignition source into the main chamber in step (a).

11. The method defined in claim 10 wherein the step of verifying the ignition source is alight in the main chamber is via direct observation or via a camera mounted within an opening in the smelting vessel.

12. The method defined in claim 1 wherein step (b) of commencing supplying the cold oxygen-containing gas and igniting combustible material in the main chamber includes commencing supplying oxygen into the main chamber and igniting combustible material in the main chamber.

13. The method defined in claim 12 wherein step (b) of commencing supplying the cold oxygen-containing gas and igniting combustible material in the main chamber includes commencing supplying technical grade oxygen at a feed temperature below 800° C. to the main chamber and igniting combustible material in the main chamber.

14. The method defined in claim 12 wherein the flow of cold oxygen-containing gas is 10-30% of normal oxygen flow for the molten bath-based smelting process.

15. The method defined in claim 14 includes verifying ignition of combustible material after step (b) of igniting combustible material in the main chamber.

16. The method defined in claim 1 wherein the step of verifying ignition is via direct observation or via a suitable camera that material is burning in the main chamber.

17. The method defined in claim 1 wherein step (c) of commencing supplying the carbonaceous material includes supplying the carbonaceous material into the main chamber at a feed temperature below 150° C.

18. The method defined in claim 1 wherein step (c) includes verifying that carbon dioxide generation in the main chamber is ongoing via an on-line gas analysis system.

19. The method defined in claim 1 wherein step (d) includes ramping up supplying the oxygen-containing gas and the carbonaceous material supplied in steps (b) and (c) respectively of the method or supplying increasing amounts of other oxygen-containing gas and carbonaceous material into the main chamber.

20. The method defined in claim 1 wherein step (d) includes ramping up supplying the metalliferous material into the main chamber.

21. The method defined in claim 1 wherein the molten bath-based smelting process includes the steps of:
  (a) supplying the solid carbonaceous material and the metalliferous material which is solid or molten into the molten bath and generating reaction gas and smelting metalliferous material and producing molten metal in the bath;
  (b) supplying the oxygen-containing gas into the main chamber for above-bath combustion of reaction gas in order to generate heat for smelting the metalliferous material to molten metal; and
  (c) producing significant upward movement of molten material from the bath by gas upwelling in order to create heat-carrying droplets and splashes of molten material which are heated when projected into a combustion region in the top space of the main chamber and thereafter fall back into the bath, whereby the droplets and splashes carry heat downwards into the bath where it is used for smelting of the metalliferous material.

* * * * *